United States Patent Office 3,083,249
Patented Mar. 26, 1963

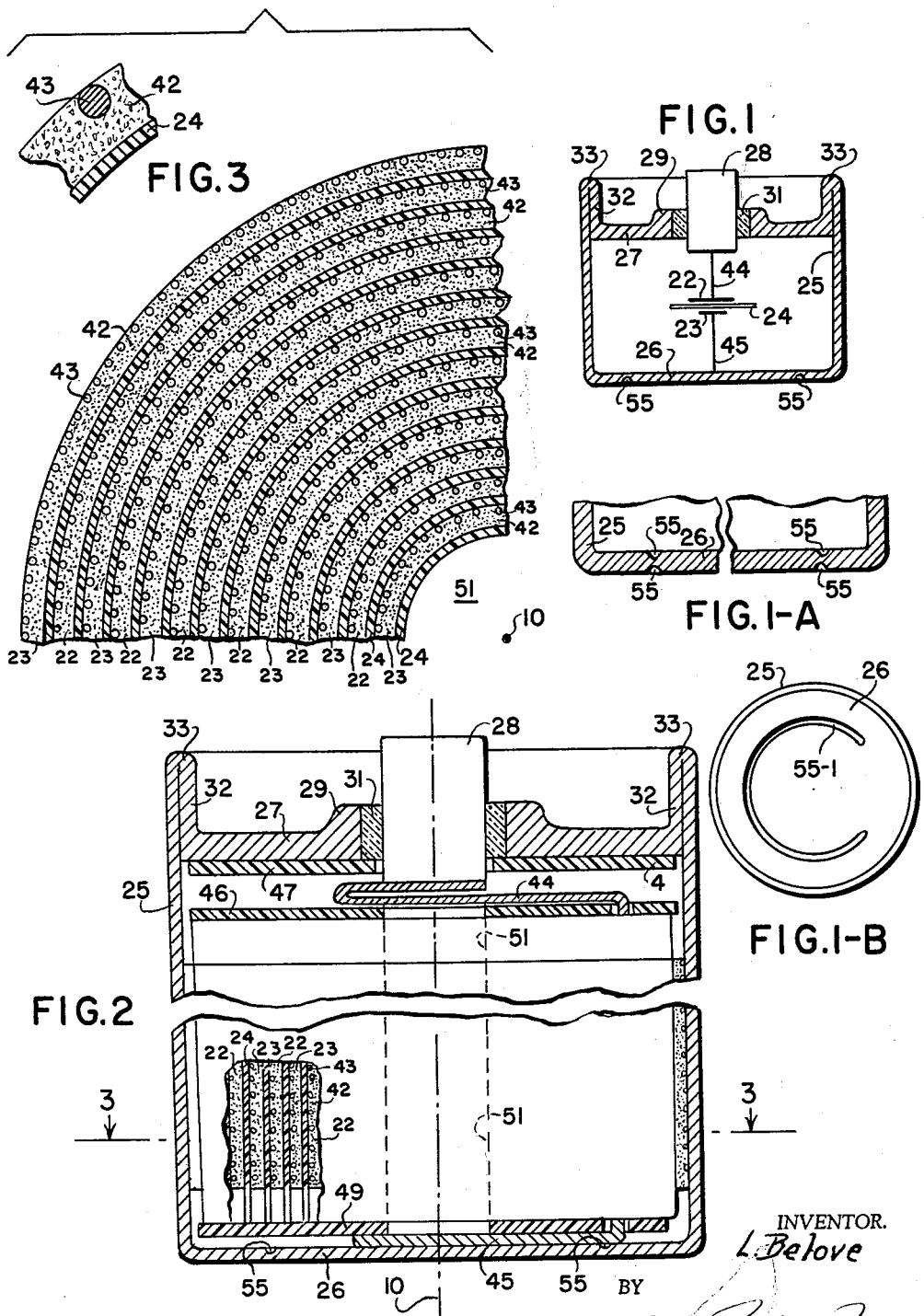

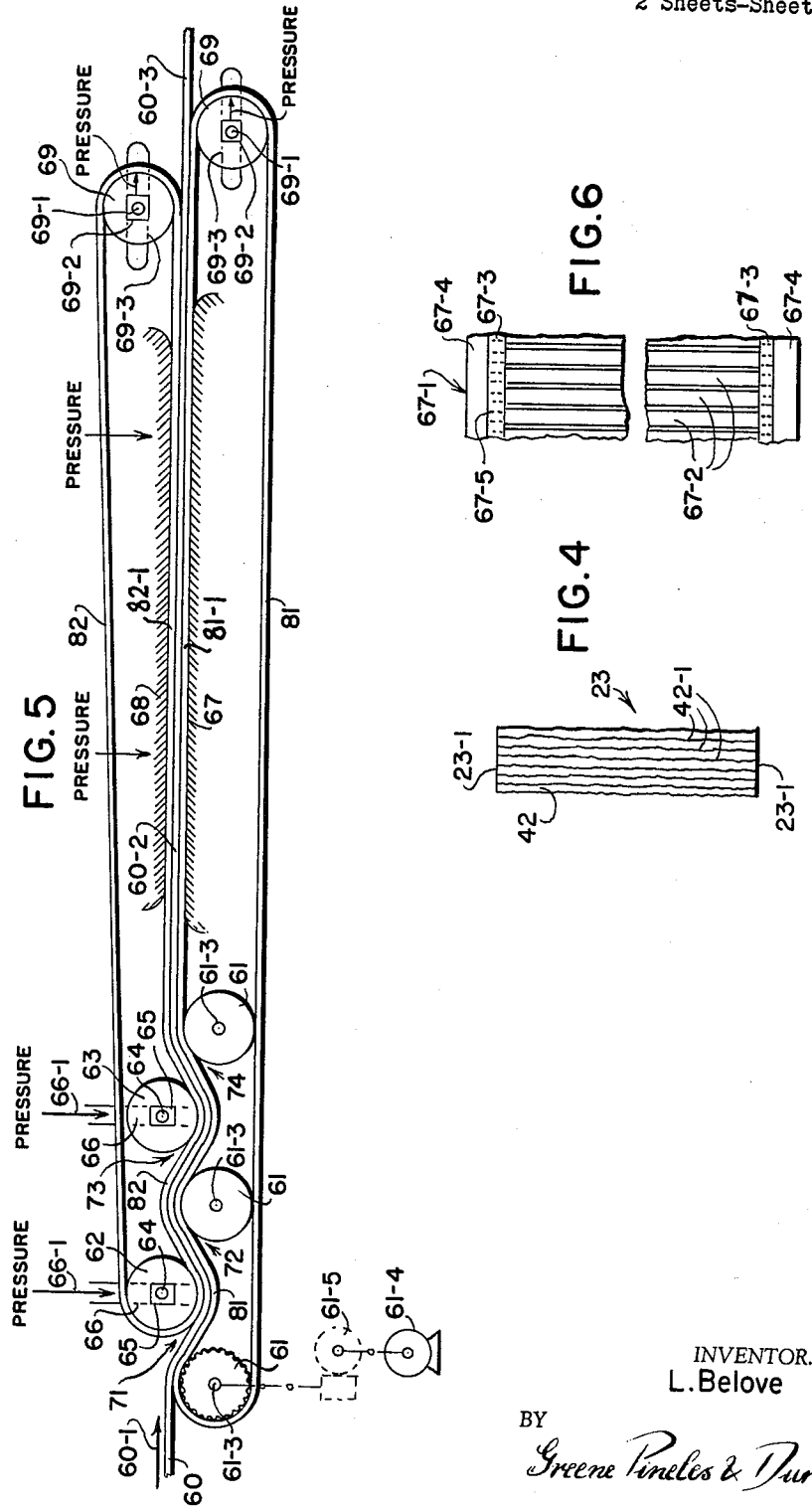

3,083,249
COILABLE SINTERED ELECTRODE PLATE FOR ALKALINE STORAGE BATTERY AND COILED ELECTRODE ASSEMBLY FORMED THEREWITH
Louis Belove, 29 Overlook Road, Ardsley, N.Y.
Filed Dec. 18, 1959, Ser. No. 860,609
6 Claims. (Cl. 136—13)

This invention relates to rechargeable electric batteries, and particularly to batteries operating with an alkaline electrolyte, although some aspects of the invention are of broader scope. Alkaline battery cells operate with highly corrosive alkaline electrolyte which tends to creep and penetrate the joints along which one or more battery terminals are sealed through the casings of such battery cells. The creepage of alkaline electrolyte is particularly critical in battery cells which are known as "sealed" cells. In all such heretofore known sealed alkaline battery cells, the edge of the metallic cell casing is crimped and clamped under pressure over an adjoining edge region of the metallic cover wall across a sealing gasket of plastic insulating material held clamped between the so joined casing region, to provide the best possible liquid-tight seal between them. In practice, it has been found very difficult to obtain positive liquid-tight casing seals with such known sealed battery cells, and they frequently fail due to leakage of corrosive electrolyte, short-circuits, cell deterioration, and the like.

In accordance with a phase of the present invention made by Louis Belove and assigned to the same assignee, these creepage difficulties encountered with prior sealed alkaline rechargeable battery cells are overcome by enclosing their electrode assembly and electrolyte in a gas-tight, integral metallic casing wherein at least one metallic terminal is insulated from the surrounding metal casing wall by a solid and gas-tight inorganic insulating junction member which is hermetically fused to the adjacent surface portions of both the surrounding metallic terminal and the surrounding metallic casing to provide a fused seal between them, with the metallic casing being formed of at least two complementary casing sections which are fused to each other after assembling therein all cell constituents to provide hermetically tight, fused seal junctions at all joints of the cell casing.

With a battery cell having such fusion-sealed junctions of the invention at all joints of its insulated terminal or terminals and of its cell casing, there is a danger that when recharging the battery cell, an excessive charging current may inadvertently be applied thereto, thereby developing excessive internal gas pressure that might cause explosive rupture of its gas and liquid-tight fusion-sealed casing, with resulting injuries and damage to nearby individuals and structures. In accordance with a further phase of the invention made by August B. Mundel and assigned to the same assignee, a relatively extended metallic wall region of the cell casing of such fusion-sealed cell is separated from an adjacent wall region thereof by a thin and narrow, loop-like, elongated casing-wall zone operating as a casing rupture zone, and having a thickness which is only a fraction of the thickness of the adjoining wall regions, and causing such rupture zone to break open at least along a portion of its length at a predetermined level of rising internal gas pressure, to permit escape of excessive developed gases through the fractured, narrow casing rupture zone before excessive gas pressure fractures another wall portion under higher gas pressure developed in the fusion-sealed, gas-tight cell casing.

In known alkaline batteries operating with sintered electrode plates of opposite polarity, it is often desirable to give the assembled, opposite-polarity sintered electrode plates a spirally-coiled or wound shape, for assuring utmost utilization of the interior cell space and supplying a maximum ampere-hour capacity within a given cell volume. Heretofore, it was believed that—in order to enable coiling of sintered electrode-plate assemblies of such alkaline battery cells—it was essential to form such coiled electrode assemblies out of sintered electrodes having only a limited maximum thickness. In order to provide with such extremely thin sintered electrodes, the desired ampere-hour capacity within given limited cell dimensions, the spirally-coiled electrode plate assembly has to be formed out of relatively large-area sheets of extremely thin, loaded sintered electrode plates, the pores of which are loaded with the active electrode material, and the manufacture and assembly of which involves a great deal more labor than when forming a battery cell of the same ampere-hour capacity with sintered electrode plates having the conventional greater thickness, such as 0.020" or greater.

In accordance with a phase of the invention made by Louis Belove and assigned to the same assignee, a highly effective coiled assembly of sintered electrode plates of alkaline battery cells operating with sintered electrodes having a thickness of at least about 0.015", such as 0.020" or greater, is obtained by forming the relatively thick sintered electrodes thereof with a porous layer of sintered metal powder particles united to one side surface only of a coextensive metallic backing foil or grid, the ductility and tensile strength of which are greater than that of the sintered-particle layer by several orders of magnitude, and winding or spirally coiling an assembly of at least two such relatively thick electrode plates of opposite polarity on opposite sides in superposed relationship on opposite sides of a microporous insulating spacer containing alkaline electrolyte, so that the thin, ductile backing grid of each plate has along the exterior convex surface of each electrode plate and holds compressed along the concave grid surface, the sintered layer thereof, and retains in this compressed sintered layer any loosened metal particles thereof together with the active electrode material filling its pores.

The foregoing and other objects of the invention will be best understood from the following description of exemplifications thereof, reference being had to the accompanying drawings, wherein:

FIG. 1 is a partially cross-sectional and partially diagrammatic view of an alkaline battery cell exemplifying the invention;

FIG. 1-A is a vertical cross-sectional view and FIG. 1-B is a horizontal cross-sectional view of different forms of cell casings for battery cells of the invention;

FIG. 2 is a vertical cross-sectional view of one practical form of battery cell of the invention;

FIG. 3 is a transverse cross-sectional view, on a greatly enlarged scale, of the battery cell of FIG. 2, along line 3—3 thereof;

FIG. 4 is a plan view of a longitudinal portion of one form of electrode plate strip used in a battery cell of the invention, in its flat, planar shape, before forming therewith a coiled electrode assembly of the invention;

FIG. 5 is a diagrammatic view of one form of apparatus used for producing in the sintered, loaded layer of a relatively thick cell-electrode plate-trip, an array of adjacent, substantially parallel crack-lines extending transversely to the side edges of the plate-strip; and FIG. 6 is a plan view of a longitudinal section of a modified form of strip-straightening structure for an apparatus such as shown in FIG. 5.

An exemplification of the invention will now be described in connection with a tubular or cylindrical battery cell of the type used in conventional flashlights, wherein one or a column of several similar battery cells are held in superposed relation for supplying current to a flashlight bulb, or in generally analogous applications wherein one or an assembly of battery cells are used to supply electric power to a load circuit thereof. However, the present invention is applicable to battery cells having cell casings of rectangular, oval or other shapes, as required in different applications thereof.

FIG. 1 shows diagrammatically, and FIGS. 2 and 3 show structurally, one example of a battery cell representative of the phases of the invention disclosed herein. The battery cell is shown as having one pair of superposed electrode plates 22, 23 of opposite polarity, held separated by a porous or microporous electrically-insulating separator sheet 24 which holds the alkaline electrolyte through which electrolytic action is maintained between the active electrode material of the two electrode plates 22 and 23. In accordance with a phase of the invention disclosed herein, the superposed opposite-polarity electrode plates 22, 23 are shown coiled or wound into a spirally-coiled electrode structure or assembly (FIGS. 2 and 3) held in the compartment space of a tubular cell casing 25 with the axis of the coiled electrode assembly shown generally parallel to the major or vertical axis of the tubular battery casing 25. The battery cell shown is of the rechargeable alkaline type operating with sintered electrode plates, batteries of this type being described in, for instance, Koren et al. Patent 2,708,212, and also in the article, "Nickel Cadmium Battery Plates," published in the Journal of the Electrochemical Society, pages 289–299, volume 94, No. 6, of December, 1948, the records of the Electrochemical Society, Inc., establishing December 20, 1948, as its publication date; this article being also published in volume 94, Transactions of the Electrochemical Society, of 1948.

Alkaline batteries of this type operate with a corrosive alkaline electrolyte which tends to leak through all joints between the insulated metallic cell terminals passing to the exterior of the cell casing for providing external connections to at least two of the opposite-polarity electrodes of the electrode assembly. It has long been known that corrosive alkaline electrolyte of such battery cells tends to creep and penetrate through all joints along which one or more external metallic cell terminals or leads are sealed through the cell casing. The electrolyte-creepage difficulties present a particularly critical problem in alkaline battery cells of the type known as "sealed" battery cells. In all prior sealed alkaline battery cells, the seal between the insulated terminal wall and the major adjacent casing wall of the cell is provided by crimping the edge region of the metallic casing and clamping it under pressure over an adjoining edge region of a metallic terminal or cover wall thereof, with a sealing gasket of plastic or elastomeric insulating with the sealing material interposed and held tightly clamped between the edge regions of the metallic casing and its insulated terminal wall, to provide the desired liquid-tight seal between them. In practice, it is difficult to obtain on a consistent basis, liquid-tight seals in the known sealed casing structures of such alkaline battery cells, and they fail frequently due to leakage of the corrosive electrolyte, short circuits, cell deterioration, and other related causes.

In accordance with a phase of the present invention described below and made by Louis Belove, these creepage difficulties encountered with prior sealed alkaline rechargeable battery cells are overcome by enclosing their electrode assembly and electrolyte in a gas-tight, integral metallic casing wherein at least one metallic terminal is insulated from the surrounding metal casing wall by a solid and gas-tight inorganic insulating junction member which is hermetically fused to the adjacent surface portions of both the surrounding metallic terminal and the surrounding metallic casing to provide a fused seal between them, with the metallic casing being formed of at least two complementary casing sections which are fused to each other after assembling therein all cell constituents to provide hermetically tight, fused seal junctions at all joints of the cell casing.

The tubular cell casing 25 is of metal, and is shown as being of cylindrical shape, although it may have a rectangular or other shape. The tubular casing 25 has a bottom wall 26 which is an integral part thereof, and a metallic top wall 27 which is fused through a fusion joint 33 to the adjacent top edge of the metallic casing 25. Within the metallic top wall 27, is held a metallic cell terminal 28 which is insulated from the surrounding thicker wall region 29 of the top wall 27 by a surrounding loop or loop-shaped insulating sealing and junction member 31. The insulating sealing and junction member 31 is of highly dense, solid, inorganic gas-tight insulating material such as glass or ceramic material of the type used in making gas-tight envelopes for vacuum amplifier tubes or analogous gas-tight envelopes or casings. The top wall 27 of the cell casing is shown as having an upwardly-bent rim edge 32 shaped to fit within the upper edge of the cylindrical cell casing 25. The two superposed, opposite-polarity electrode plates of the battery cell are connected, respectively, to the insulated upper metal terminal member 28, and to a wall portion of the tubular metal casing 25. In the form shown, the positive electrode plate 22 is shown connected through a metallic connector strip or tab 44 to the inward face of the insulated metallic terminal 28 of the upper casing wall 29 of the casing. The opposite-polarity negative electrode plate 23 is connected through a strip or metallic tab 45 to the metallic bottom wall 26 which forms an integral part of the tubular metal casing 25 of the cell.

As stated above, the upper metallic cell terminal 28 is insulated by an insulating loop 31 of solid glass or ceramic material, from the surrounding metallic wall portion 29 of the upper metallic wall 27 of the cell casing 25. The insulating junction is joined by fusion at elevated fusion temperature to the outer surface of the surrounded metallic terminal member 28 and to the surrounding surface of the thicker central wall portion 29 of metallic top wall 27, by fusion at elevated temperature at which the solid material of the insulating loop fuses to the facing surface portions of the two adjoining metallic structures 28 and 27. After assembly of the cell components, the rim edge 32 of the metallic top wall 27 and the upper edge of the tubular cell casing 25 are likewise joined to each other by fusion at elevated temperature at which the adjoining wall edge portions melt and fuse into an integral gas-tight metallic structure.

Without thereby limiting this phase of the invention, there will be given below, data of a practical battery cell having such hermetically tight cell casing with the insulated terminal and all wall portions of the casing joined to each other by fusion into a tight, fused, integral cell casing structure. The cell casing 25 and its top wall 27 are formed of cold-rolled steel and thereafter plated or coated with an adhering coating of nickel, since each battery cell is designed for operation with nickel-cadmium electrodes, for instance of the type described in Koren et al. Patent 2,708,212. The central terminal member is formed of a nickel-iron alloy containing 50% nickel and 50% iron. The inorganic insulating loop 31 is formed of gas-tight borosilicate glass, such as known in the trade as "Corning 9010," which has a melting temperature below 1000° C. Before fusing the insulating loop 31 to the metallic members 27, 28, they are oxidized by heating them within an oxidizing atmosphere.

The terminal member 28 is then assembled with the surrounding glass insulating member 31 within the opening of the cell top wall 27 in a suitable jig, for instance of graphite. This top wall assembly is then passed with the jig through an oven wherein it is heated to a temperature at which the glass of the insulating junction loop 31 fuses with the facing oxidized surfaces of the terminal member 28 and top wall member 27, thereby forming an integral top wall having an electrically insulating, gas-tight, hermetically fused sealing junction 31 between the main body of metallic cell top wall 27 and its metallic terminal 28. The oxide coating previously formed on the metallic cell top wall 27 and its metallic terminal member 28, is then removed from the remaining major exposed surfaces thereof by a suitable treatment, for instance by a treatment with hydrochloric acid, leaving the cell top wall 27 and its terminal member 28 with a clean exterior metallic surface.

The coiled, sintered electrode assembly with its insulating separators is then positioned within the cell casing 25. Before assembling and coiling them, the opposite-polarity electrodes 22, 23 are provided with outwardly-projecting metallic electrode tabs, of flexible nickel sheet, for instance, the inner ends of which are welded to edge regions of the respective electrode plates so that the coiled electrode assembly has an upward-extending terminal tab 44 from the positive cell electrodes 22, and a downward-extending terminal tab 45 from the negative cell electrodes 23. After positioning the electrode assembly with the cell casing 25, the end of the downwardly-extending electrode tab 45 is welded to the central region of the cell casing bottom wall 26, and its upwardly-projecting electrode tab 44 is similarly welded to the inwardly-facing surface portion of upper metallic terminal member 28. Alkaline electrolyte is then poured into the cell so as to fill the pores of the separators 24, and the capillary electrode spacing between them, with the electrolyte. Thereupon the cell casing top wall 27 is placed or fitted between the upward edges of the tubular or cylindrical walls of cell casing 25 so that the upwardly projecting edge rim of the top casing wall 27 is substantially at the same level as the surrounding edge of the side walls of cell casing 25, being held therein by their interfitting contact engagement. Thereupon, the upwardly-facing, interfitting, upwardly-extending edge of the rim of the cell top wall 27 and the surrounding side wall edge of cell casing 25, are molten and fused to each other into a tight, integral metallic casing structure, with the metallic top wall 27 and the main cell casing 25 fused into a continuous, integral metallic structure.

To prevent loss of electrolyte when fusing at elevated temperature, the interfitting junction edges of the casing 25 and top wall 27, the cell casing assembly is held seated within the opening of a massive metallic jig engaging and surrounding the upper region of the cell casing 40 underlying its upper edge, which metallic jig is cooled, for instance, by circulating through it a cooling liquid such as water, or evaporating thereon the cooling liquid while the interfitting upper edges of the cell casing 25 and its top wall 27 are fused to each other. In practice, good results are obtained by rotating the jig with the cell casing assembly held therein, and maintaining a constricted, pencil-like torch arc in a protective gaseous medium such as helium or argon, between the tip of an arc electrode and an adjacent edge portion of the rotating edge of the cell casing assembly, for instance by a constricted torch-arc apparatus as described in Oyler et al. Patent 2,884,510, and the literature describing commercial torch-arc apparatus of this type.

The metallic casing 25 and metallic terminal 28 may be formed of any metal which resists corrosion when continuously subjected to alkaline electrolyte, such as stainless steel, nickel and the like. However, the casing and the terminals may also be formed of other metals provided all exterior surfaces of such metal casing and terminals which are exposed to the electrolyte, are coated with a continuous, adhering metal coating of metal which resists corrosion by alkaline electrolyte.

As stated before, the metal of the cell casing 25 and of the casing top wall 27 is conventional cold-rolled steel which has been plated with an adhering nickel coating. In practice, after first forming the cell casing 25 and its top wall 27 in the desired final form, such as shown in FIG. 1, a large quantity of such casing parts is nickel-plated in a conventional nickel-plating bath. In such conventional nickel-plating process the edges of the steel casing 25 and of the steel cover 27 have electrodeposited thereon a much thicker or higher deposit of nickel than is deposited along the other surface portions of the so-plated casing parts. When forming the fused weld joint 32, between the interfitting upward edges of the cell casing 25 and its top wall 27, the larger amount of nickel previously electrodeposited on the fused edges, diffuses in the molten steel of the fused casing edge portions, thereby enriching the fused steel edges 32 of each cell casing with nickel and providing each fused casing edge 32 with the desired protection against oxidation. There is thus obtained a hermetically sealed, rechargeable alkaline battery cell wherein the electrode assembly and corrosive electrolyte are hermetically enclosed in a gas-tight, integral, metallic casing having at least one metallic electrode which is insulatingly joined by fusion of an insulating sealing junction loop of high-density, inorganic material at elevated temperature, to the casing and terminal portions which it joins, with the casing having two or more complementary casing sections for enabling the electrode assembly to be assembled therein, the junction portions of complementary casing parts being joined by fusion at an elevated fusion temperature to provide a hermetically sealed cell casing, all joints of which are sealed by fusion.

The electrode assembly of such fusion-sealed cell casing may be formed of any type of superposed, porous, properly-loaded sintered metal-powder plates which are separated by an electrolyte-holding porous separator sheet or stratum of electrically insulating material such as filter paper of alpha cellulose. For instance, the electrode assembly may consist of a stack of sintered and loaded electrode plates of one polarity alternately superposed over electrolyte-holding separators and electrode plates of opposite polarity, in the manner shown, for instance, in U.S. Patent 2,527,888 or British Patent 214,799 of 1924. In the form of the battery of the invention shown in FIG. 2, the electrode assembly is formed of two superposed electrode plates 22, 23 of opposite polarity, and an interposed electrolyte-holding separator sheet 24, which are coiled into a spirally-coiled plate assembly containing at least one-half of one coil turn. By way of example, the specific battery cell shown in FIG. 2 has the size of a conventional "D" dry cell, and its electrode assembly contains such superimposed, opposite-polarity electrode plates 22, 23 coiled into five coil turns fitting relatively tightly within the interior compartment space of the tubular casing 25, so that the electrically-conductive outer surface of electrode plate 23 forming its outer coil turn makes metallic contact with the surrounding inner metallic surface of tubular or cylindrical cell casing 25. In the battery cell shown in FIG. 2, the coiled electrode plate 22 is loaded with positive electrode material and constitutes the cell anode, and the coiled opposite-polarity electrode plate 23 is loaded with negative electrode material and constitutes the cell cathode.

Prior to the present invention it was believed that in order to provide a coiled or spirally-wound assembly of superposed, opposite-polarity, fully-loaded sintered electrode plates of an alkaline battery cell, it was essential to limit the maximum thickness of each coiled sintered electrode plate to less than 1 millimeter. In accordance with a phase of the invention made by Louis Belove, a highly effective, spirally-wound assembly of superposed sintered, fully-loaded, electrode plates and interposed electrolyte-holding separator sheets for an alkaline battery cell, may be formed of sintered electrodes having a thickness of 0.015" or greater, such as 0.020" to 0.030", and greater, by forming such relatively thick sintered electrode plates with a porous layer of sintered powder particles united to one surface only of a coextensive metallic backing foil or grid having a ductility and tensile strength which is greater by several orders of magnitude than that of the sintered-particle layer, and winding such superposed electrode plates into a coiled electrode assembly wherein the ductile, high-tensile-strength grid of each superposed coiled electrode plate constitutes part of the exterior, convex surface layer of each electrode plate for thereby holding compressed the sintered-particle layer with its active electrode-material load and preventing escape of loosened metal particles and active electrode material of the sintered plate that results from fracture or cracking of such relatively thick sintered-particle layer when flexed in forming with such thick plates a spirally wound electrode-plate assembly. In its broader aspects, the stronger, thin ductile backing grid united along the exterior surface of the relatively thicker sintered layer of each electrode plate, is of great value in forming spirally coiled electrode assemblies with such plates having a strong, thin backing grid extending along the concave interior surface of each electrode plate.

The backing grid of such sintered, fully-loaded coiled electrode plates of the invention may be formed either of a thin wire mesh of metallic wire which resists corrosion by the alkaline electrolyte, or of a thin metal foil or sheet having perforations filled with sintered metal powder particles of the sintered powder layer united thereto. Such metallic backing grid has also the important function of providing a good electrical conducting connection from all area portions of the sintered, loaded electrode layer thereof to the external terminals of such battery cell, in addition to providing a reinforcing backing for the fragile sintered-particle layer of the electrode plates. As an example, where the sintered, coiled electrode plates of the invention are made with a backing grid formed of a continuous metal foil which has the required array of distributed perforations for interlinking it with the sintered powder layer and provide for the passage or entry of electrolyte therethrough, such foil grid may be formed by conventional nickel electroplating process. Such metallic backing sheet or foil may have the perforations formed therein either in the plating process or after first plating a continuous metal sheet or foil, by stamping therein the desired array of adjacent perforations. In stamping perforations in such continuous metallic backing sheet or foil, the stamping die may be shaped so that each perforation formed or punched therein has a short, toothed or tooth-free collar portion which is embedded in the sintered powder layer united to the surface of the metal foil, from which the toothed collar projections extend for only a portion of the thickness of the sintered metal layer united thereto.

As an example, a coiled, sintered electrode plate of the invention, which is 0.020" thick, may be formed with a metal foil backing grid of high ductility and high tensile strength, having an array of closely-spaced and distributed perforations, the area of which constitutes about half the grid area which is coextensive with the surface of the grid area to which the loaded sintered powder layer is united. In such coiled electrode plate, its metal foil backing grid may have a thickness of about 0.003" to 0.004", and the individual perforations may have a metal foil collar projecting from only one side thereof and embedded in the layer of sintered powder particles united thereto, the height of the perforation collars being only a fraction of the thickness of the sintered layer, for instance, about 0.003" to 0.004".

As an example, in the battery cell of FIG. 2, each of the coiled electrode plates 22, 23 has a backing grid 42 of metallic wire mesh screen extending along the outer, convex surface of each plate 22, 23 with a porous sintered layer 43 of nickel powder particles extending along and being united to the concave side of the wire-mesh grid 42, and with sintered nickel powder particles also filling the openings or spaces between the wires of the wire grid 42. Such sintered, porous electrode plates 22, 23 of .020" thickness, may be formed, for example, as follows:

A thin wire gauze or screen 42 of .005" thick nickel wire is placed directly on the bottom surface of a horizontally-positioned shallow mold cavity of graphite, for instance, with a cavity depth that yields a sintered plate of .020" thickness. The mold cavity is then filled to its top level with fine nickel powder so that all remaining spaces of the shallow mold cavity are filled therewith. Thereafter, the layer of nickel powder so held in the shallow cavity is sintered in a conventional way in a furnace to produce a sintered nickel particle layer 43 united to one side only of the backing grid 42, with the sintered nickel powder also filling all open spaces of the grid 42 and united to most surfaces of its wire mesh. In all other respects, such sintered electrode plates may be treated in the manner described in Koren et al. U.S. Patent 2,708,212 to provide opposite-polarity sintered plates the pores of which are loaded with the required active electrode material. In that patent a general method comprising the steps of loading the porous plates with active electrode material and thereafter activating such material are described. In practice, good results are obtained with coiled, sintered electrode plates having a porosity of about 82%, or in general, between 80% and 75%, although in some applications such plates may be produced with a higher porosity, such as 90%. For practical purposes, the porosity of such sintered electrode plates should not be smaller than 70%.

Good results are obtained with such sintered plates having thicknesses of .018", .025", .035", .050", .075", 0.1", for the negative plates, in cooperation with positive sintered plates having thicknesses of .022", .035", .050", .070", 0.1" and 0.14", respectively, the pores of which are loaded with conventional negative and positive electrode material. Good results are also obtained with the coiled opposite-polarity sintered plates each having a loaded sintered layer of the same thickness.

When two sintered electrode plates of the invention separated by a porous or microporous insulating separator, are coiled into a coiled electrode assembly of the type shown in FIGS. 2 and 3, such coiled electrode assembly has at its center a hollow space 51 of limited cross-sectional area. As an example, a cylindrical battery cell of the invention, of the type described above in connection with FIG. 2, having the size of a conventional "D" size dry cell, and having a cylindrical interior casing space 1.25" in diameter, has a central, coaxial, hollow space about $5/16$" or $3/8$" in diameter. Each of the coiled, sintered electrode plates 22, 23 has welded to a side edge portion thereof, a metallic terminal strip or tab 44, 45, respectively. The terminal tabs 44, 45 are usually formed of flexible sheet metal such as nickel, and the metal tabs are welded to the metallic grid 42 extending along the convex surface of the respective electrode plates, so that when the superposed electrode plates 22, 23 are coiled into an electrode assembly such as shown in FIG. 2, the positive electrode tab 44 projects outwardly from the top end of the coiled electrode assembly (as seen in FIG. 2), and the negative terminal tab 45 projects outwardly from the opposite or bottom end thereof. To secure good conductive weld connection between such terminal tabs 44, 45 and the backing grid 42 of the respective electrodes 22, 23, the welded-on grid portion has removed from its exterior surface any nickel particles that may have been sintered to the exposed outer grid surface to which the tab is united.

In coiled, assembled condition, such as shown in FIGS. 2 and 3, the opposite-polarity electrode plates 22, 23 are slightly pressed together against the interposed insulating separator 24, and they are held in this condition by the surrounding walls of the tubular metallic casing 25 in which the coiled electrode assembly is positioned. Before positioning the coiled assembly of electrode plates 22, 23 in the interior of the tubular metal casing 25, an insulating separator sheet or washer 46 of synthetic resin material, for instance, is placed over the top of the coiled electrode assembly, as seen in FIG. 2, the insulator sheet or washer 46 having a slit through which the upwardly-projecting terminal tab 44 passes to the exterior of the assembly.

A similar insulating separator sheet 49 is placed over the bottom of the coiled electrode assembly, with the bottom terminal tab 45 extending through a slit in the insulating separator sheet 49, downwardly beyond the same. Each of the upper and lower insulating separator sheets 46, 49 extends over the entire cross-sectional area of the top and bottom surfaces of the coiled electrode plate assembly for insulating them from the adjacent metallic top wall 27 and metallic bottom wall 26 of the cell casing 25, except for a central opening aligned with the free, central, hollow space 51 of the coiled electrode assembly. A similar insulating separator sheet 47 is placed under or affixed, as by cement, to the downwardly-facing surface of the metallic casing top wall 27 for insulating it against contact engagement with the upper metal terminal tab 44 of the electrode assembly. A central opening of the top insulating sheet 47 of the metallic casing top wall 27 provides an opening for passing therethrough the bottom, inwardly-projecting end of the insulated central upper metal terminal 28 of the cell casing.

Before the coiled electrode assembly, such as shown in FIG. 2, is placed or inserted into the interior of the upwardly open cell casing 25, the metallic bottom tab 45 projecting downwardly through the slit of its bottom insulator separator 49 is folded or bent under its downwardly-facing surface so that a portion of the tab underlies and is exposed through an opening of the sheet spacer 49 to the central, hollow interior space 51 of the electrode assembly. After positioning the so-prepared coiled electrode assembly in the interior of the cell casing 25 so that the horizontally bent or folded portion of bottom tab 45 makes contact with the interior surface of the metallic casing wall 26, the tab portion underlying the hollow interior space 51 of the electrode assembly is welded to the metallic casing wall 26. Such welding may be done by inserting a rod-like welding electrode of an electric resistance welding equipment through the hollow, interior central space 51 of the coiled electrode assembly, until the downward end of the welding electrode rod makes contact with the underlying surface of the folded end region of the bottom terminal tab 45, whereupon the so-engaged tab 45 is welded to the bottom wall of the casing while held pressed against a cooperating exterior welding terminal member of the welding equipment. Thereafter, the portion of the upper terminal tab 44 which extends through the slit of the upper insulating sheet 46, is welded, as by resistance welding, to the inner end surface of the central insulated metal terminal 28 of the metallic top casing wall 27 while it is held above the top edge of the open tubular cell casing 25.

Alkaline electrolyte is then poured or injected into the porous insulating separators 24 so as to fill with the alkaline electrolyte all their capillary pores extending between the separated, opposite-polarity electrode plates 22, 23. Thereupon the casing top wall 27 is placed or fitted between the interfitting upper edges of the open tubular or cylindrical walls of the cell casing 25, so that the upper edge rim 32 of the top casing wall 27 is substantially level with the surrounding edge of the tubular casing 25. Thereafter, the upwardly-facing, interfitting upper edge of the rim 32 of the casing top wall 27 and the surrounding side wall edge of the cell casing 25 are molten and fused to each other into a tight, integral metal casing having all casing junctions fusion-sealed to provide a gas and liquid-impervious hermetically sealed cell casing.

The sintered metal-powder layer of the electrode plates of the invention has to have a high porosity, such as 80% porosity, and is very fragile. As a rule, they are also sintered in a generally planar shape. As a result, the coiling of superposed planar sintered battery plates of the invention having a thickness of .020″ or greater, causes each of the porous sintered-particle layers of the planar plates to crack in an irregular, haphazard manner. Because of such irregular cracking in their sintered-particle layers, it is impossible to wind the superposed planar electrode plates into a coiled plate assembly wherein the facing electrode surfaces are generally uniformly spaced from each other across the electrolyte-holding porous separator. Such irregularly cracked sintered layers also reduce the ampere hour capacity of the coiled electrode assembly.

In accordance with the invention, before coiling such superposed, opposite-polarity battery plates into the desired coiled electrode assembly, each generally planar, sintered battery plate is subjected to controlled cracking treatment which produces therein an array of substantially parallel, adjacent longitudinal cracks extending parallel to the axis around which the electrode assembly is coiled. In other words, the adjacent cracks of the array of parallel cracks extend transversely or perpendicularly to the side edges of each superposed sintered battery plate of the coiled electrode assembly, which permits coiling of superposed, sintered electrode plates into a coiled electrode assembly wherein adjacent electrode surfaces of the coiled plate turns are spaced from each other with desired, substantially uniform minimum spacing.

In the form of the invention described above in connection with FIGS. 2 and 3, the superposed opposite-polarity sintered plates 22, 23 are wound around a generally common central axis indicated by dash-line 10. Before assembling them across their porous insulating separator 24, each generally planar sintered plate 22, 23 is subjected to a cracking action wherein the sintered-particle layer 42 of each plate has produced therein an array of generally parallel layer cracks. FIG. 4 shows a longitudinal strip section of a sintered, fully-loaded electrode plate, such as plate 23 of FIGS. 2 and 3, while it is still in the form of a planar strip having two side edges 23–1. To permit coiling of such superposed sintered, loaded electrode-plate strips, the sintered metal-particle layer 42 of each electrode strip has produced therein an array of adjacent parallel cracks shown in FIG. 4 by the array of adjacent parallel crack lines 42–1 extending substantially perpendicularly to the longitudinal side edges 23–1 of the longitudinal sintered electrode plate strip 23. The adjacent cracks 42–1 of each such electrode-plate strip are also parallel to the axis 10 of their coiled electrode assembly shown in FIGS. 2 and 3.

The adjacent cracks 42–1 so produced in the sintered layer of each electrode plate 22, 23 has the form of a generally straight line which is generally parallel to the coiled assembly axis 10. However, the crack lines 42–1 may not be geometrically straight lines because they are formed in a layer of sintered particles, a straight crack of which is likely to have some irregularities. The adjacent parallel crack lines 42–1 in the sintered layer 42 of each electrode plate, are spaced from each other by a crack distance or spacing which is sufficiently small to permit coiling of the superposed sintered battery plates into a spirally coiled assembly of generally cylindrical shape, wherein innermost coiled plate turns will assume a substantially uniform, cylindrical curvature and the successive outer coiled plate of the assembly will conform in curvature to the underlying adjacent coiled plate turns and maintain generally uniform, minute or close spacing between the coiled plate turns across the suitably compressed electrolyte-holding microporous spacer film extending between them.

As an example, and without thereby in any way limiting the scope of the invention, a desired coiled electrode assembly for a battery cell of the size known as the "D" cell, as described above in connection with FIGS. 2 and 3, may be formed with a sintered negative electrode plate strip .025″ thick, and a sintered positive electrode plate strip .035″ thick, and having each sintered layer provided with transversely-extending crack lines spaced from each other by a crack spacing or distance of about 1/16″. Although, if needed, the crack spacing may be made smaller than 1/16″, for instance 1/32″, good results are also obtained by making the spacing between adjacent transverse cracks of the sintered layers of such coiled electrode plate assembly for a "D" cell, greater than 1/16″, for instance 3/32″ or 1/8″, or 3/16″. When cracking relatively thick sintered electrode plates of the type described above in a direction transverse to the side edges of the coiled electrode plate strips, the sintered-plate cracks will frequently deviate more or less from a generally straight, transverse line perpendicular to the side edges and will have an irregular wave-shape, because of the tendency of the sintered-particle layer of such electrode plates to crack in arbitrary directions with some deviations from the direction of a straight line extending transversely to the side edges of the sintered-plate strip. In practice, such non-uniformity and deviations from a straight, transverse crack line, do not materially impair the relatively close, uniform spacing between the adjacent surfaces of the superposed coiled sintered-plate turns across the porous insulator of such coiled electrode assembly of the invention.

In accordance with a phase of the invention made by Edward Shields and assigned to the same assignee, strips of generally planar, sintered electrode plates of the type described above, having a thickness of about .020″ and greater, and loaded with the required electrode material for the negative and positive plates, respectively, have produced therein the desired array of adjacent crack lines extending transversely to the side edges of the plate strips in a controlled production manner, by passing such sintered electrode plates between opposite convex bending members arranged to substantially simultaneously engage three different spaced transverse plate zones of the moving plate strip and thereby bend successive plate lengths passing between them in opposite directions, and cause such bending to produce in each successively bent plate length the desired controlled array of parallel, adjacent transverse crack lines required for enabling the coiling of such superposed cracked electrode plates in a relatively tightly wound electrode assembly having the required substantially close and uniform spacing between the facing opposite-polarity electrode surfaces.

FIG. 5 shows by way of example one form of a plate-cracking apparatus for producing in a continuous strip of a generally planar sintered electrode plate having a sintered layer of metal particles and a coextensive metallic backing grid, the desired controlled array of substantially parallel crack lines in the direction transverse to the side edges of the plate strip. To simplify and clarify the explanation thereof, the dimensions of the different cooperating elements of the cracking apparatus shown, and of the cracked sintered plate, are shown exaggerated.

An elongated strip 60 of a fully loaded sintered electrode plate, of the type described by way of example in connection with FIG. 4, while it is still in its original, generally planar condition, is fed from a supply stack (not shown) to the left of FIG. 5, so as to move between one set of elongated, convex bending members 61 simultaneously engaging one plate surface of the sintered strip, and an opposite set of bending members 62, 63 engaging simultaneously the opposite plate surface of the sintered plate strip 60 along a plurality of spaced transverse zones of the moving plate strip 60. Each of the two sets of bending members may consist of any desired number of rollers for subjecting the electrode strip to at least two sets of opposite cracking actions in at least two directions opposite to its major surface area. In the specific apparatus shown, three convex bending members 61 form the one set of bending members 61, and two convex bending members 62, 63 form the opposite set of bending members engaging the opposite plate surfaces of the moving sintered plate strip 60. In the form shown, each of the different convex bending members 61, 62, 63, consists of a roller having a cylindrical or convex bending surface, and arranged to rotate around a central axis or shaft of the respective roller.

The two bending members or rollers 62, 63 which overlie the moving sintered-plate strip 60 of FIG. 5, are positioned and pressure-biased to move into the space separating the two adjacent underlying rollers 61 of the other roller set, so that a height portion of each of the two overlying rollers 62, 63 enters between or overlaps a substantial part of the height of the underlying bending roller 61 between which it is positioned. With such movable pressure-exerting mounting of the overlying set of bending rollers 62, 63 between the underlying pairs of bending rollers 61, the planar, sintered electrode plate 60 which moves between them, is first bent in downward direction as it passes through the roller space 71 between the first underlying roller 61 and the first overlying roller 62, and then bent in the opposite upward direction as it passes through the roller space 72 between the first overlying roller 62 and the second underlying roller 61, and then again bent in the opposite downward direction as it passes through the roller space 73 between the second underlying roller 61 and the second overlying roller 63, and then again bent in opposite upward direction as it passes through the further roller gap 74 between the overlying second roller 63 and the third underlying roller 61. The curvature and diameter of the convex or cylindrical surface of the individual bending rollers 61, and 62, 63, their roller spacings 71, 72, 73 and 74, and the extent of height overlap, are so chosen or set that the successive opposite bends imparted by them to each longitudinal portion of electrode plate strip 60 moving therebetween, produce in the sintered strip layer an array of substantially transverse, linear cracks extending along successive, adjacent transverse zones of the moving electrode plate, with the required closeness of the adjacent crack lines for enabling ready coiling of an assembly of superposed plates into a closely wound electrode plate assembly wherein the facing opposite-polarity electrode surfaces maintain the required substantially close and uniform spacing across the porous electrode spacer interposed between them.

In accordance with a phase of the invention, instead of passing it directly in engagement with the convex or cylindrical exterior surfaces of the two opposite sets of bending rollers 61, and 62, 63, the desired cracking operation is performed with greater efficiency by providing two opposite flexible guide members 81, 82 which engage and hold compressed between them the length of the sintered electrode plate strip 60 which passes with them through the roller spacings 71 to 74 of the two such opposite sets of bending or cracking rollers 61, and 62, 63, as the sintered layer of the electrode plate strip 60 is being bent and cracked along adjacent transverse zones thereof.

The two opposite, flexible and relatively wide guide members 81, 82 are arranged to hold the electrode strip 60 compressed between them and to move therewith between the surfaces of the two sets of opposite bending rollers 61, and 62, 63, in such a way as to subject each transversely extending zone of the moving electrode strip 60 held between them to a sequence of opposite bending and cracking actions which produce in the sintered layer the desired array of adjacent, uniformly-spaced, transverse crack lines 42–1 (FIG. 4). In the form shown, flexible guide member 81 has an exterior surface which underlies the eletrode strip 60 and is subjected by the convex surfaces of the underlying roller bending members 61 to upward bending forces on the downwardly-facing plate surface of the moving electrode plate strip. The opposite flexible guide member 82 has an exterior surface which overlies the electrode strip 60 and is subjected by the convex surfaces of the overlying revolving bending rollers 62, 63 to downward bending and cracking forces on the lengths of the sintered strip moving between the two opposite sets of bending rollers 61, and 62, 63. Although they need not have endless length, each of the two flexible guide members 81, 82 is shown formed of an endless belt-like guide member arranged to move with its interior belt surfaces over the exterior cylindrical surfaces of the two opposite sets of bending rollers 61, and 62, 63, respectively. With such belt arrangement, the required longitudinal motion is imparted to the elongated sintered electrode plate strip 60 between facing surfaces of the two guide belts 81, 82 moving through the roller spacings 71, 72, 73 and 74 of the two sets of bending and cracking rollers 61, and 62, 63, by imparting a driving motion to a length of at least one of the two belts 81, 82. This may be done, for instance, by keeping each of the two guide belts 81, 82 stretched and tensioned as they pass over their respective opposite bending rollers 61, and 62, 63, and under pressure engagement with the electrode strip 60 held between them; and by applying driving forces to one of these bending rollers and thereby imparting to the two flexible belts the required synchronized motion.

In the form shown in FIG. 5, each of two guide belts 81, 82 is provided with a stretching or tensioning roller 69 engaging the interior belt surface of each guide belt, and in biasing positions wherein each belt 81, 82 is held stretched and tensioned as it holds compressed by its exterior belt surface a length of the electrode strip 60, and as they are driven with it through the successive roller spaces 71, 72, 73, 74, between the two sets of bending and cracking rollers 61 and 62, 63 for subjecting each passing transverse zone of the electrode strip 60 to at least two opposite bending and cracking actions and producing in its sintered layer an array of adjacent transverse cracks 42–1, as seen in FIG. 4. It is important that the two sets of opposite bending and stretching rollers 61, and 62, 63 should have a diameter small enough for bringing them into sufficient overlapped height relation to assure that the sintered layer of the electrode plate strip 60 passing between them is subjected to two opposite bending and cracking actions in a direction perpendicular to its major surface area along each successive transverse portion thereof. In practice, good results are obtained with all bending rollers 61, and 62, 63, and the two stretching rollers 69 having a cylindrical shape.

Each of the three underlying bending rollers 61 may have a shaft 61–3 with which they are held revolvably mounted on suitable fixed bearing structures (not shown) at proper axial spacing between them. The opposite cooperating bending rollers 62, 63 may each have a shaft 64 with which it is revolvably mounted on a suitable bearing structure 65 arranged for suitable predetermined guided movement in the direction of arrows 66–1 along, for instance, fixed, rigid guideways 66, whereby each of these upper bending rollers 62, 63 is held biased and moved under pressure into the underlying space between its respective pair of underlying bending rollers 61, for exerting oppositely-directed bending and cracking forces on the electrode plate strip 60 which is moved between them. The pressure forces 60–1 applied to the guided bearing 65 of the upper set of bending rollers 62, 63 may be applied thereto by any known pressure means, for instance, springs, weights, or setting means, and the like (not shown).

Each of the two stretching rollers 69, has a shaft 69–1 with which it is revolvably mounted on a bearing member 69–2 arranged for suitable predetermined guided movement in the direction of arrow 69–4 along, for instance, suitable rigid, fixed guideway 69–3, whereby each tension roller 69 is subjected to biasing and pressure forces which hold the respective belts 81, 82 stretched and tensioned while they pass over their respective opposite sets of bending rollers 61, and 62, 63, and which are pressed with their exterior belt surfaces against the electrode plate strip 60 held between them by the applied biasing and pressure forces 66–1. With the two guide belts 81, 82 so held stretched and tensioned and also held so compressed along electrode plate strip 60 by two opposite sets of bending rollers 61, and 62, 63, the desired synchronized driving motion is imparted to the two belts 81, 82 and the electrode strip 60 held between them, by applying rotary driving forces to the leftward lower bending roller 61 over which the lower belt 81 is held stretched. This may be done by driving the shaft 61–3 of this roller 63 with a conventional electric motor 61–4 through a suitable reduction gearing 61–5.

In practice, it is of great advantage to straighten and to give a planar shape to the continuous length of a sintered plate strip 60 after it has been subjected to transverse bending and cracking actions by sets of opposite cracking rollers 61, and 62, 63, of the type described above. In accordance with the invention, the two opposite belt lengths 81–1, 82–1 of the two belt-like, flexible guide members 81, 82, which hold between them the previously-bent and cracked electrode strip 60–2, are guided under pressure through straightening means which cause the previously-bent and cracked electrode strip length 60–2 to be straightened and aligned in a plane so that it leaves the opposite guide-belt lengths 81–1, 82–1 in a generally planar condition, as indicated by the electrode plate strip 60–3 leaving the guide belt portion 81–1 in the direction toward the right, as seen in FIG. 5.

The straightening means may consist of two straightening structures engaging the interior surfaces of the belt lengths 81–1, 82–1 of moving belts 81, 82 that hold between them the electrode strip length 60–2 as it leaves the last pair of opposite bending rollers 61 and 63, for imparting a planar shape to the electrode strip length moving toward the pair of tensioning rollers 69. In the form shown in FIG. 5, the interior or back surfaces of the opposite belt lengths 81–1, 82–1 engaging the opposite plate surfaces of the electrode plate strip length 60–2 moving from the last pair of bending rollers 61 and 36 toward the pair of stretching rollers 69, are engaged and held compressed by surface portions of relatively rigid planar surfaces of two opposite flat straightening members 67, 68 for applying planar straightening forces against the opposite surfaces of the transversely cracked electrode plate length moving between them, and thereby straighten and align successive transversely-cracked, longitudinal portions of the strip 60 passing between the straightening members 67, 68 into an electrode plate strip having a planar shape, as seen at 60–3 to the right of FIG. 5.

Each of the two opposite straightening members 67 and 68 may consist of a relatively rigid, flat plate of strong, hard material, such as hard metal, extending over the entire transverse width and held under pressure over its substantially entire surface against the interior belt surfaces of the opposite belt lengths 81–1, 82–1 which hold between them the previously-cracked plate strip length 60–2 moving from the rightward pair of opposite bending rollers 61, 63 toward the pair of opposite stretching rollers 69, respectively, as seen in FIG. 5. By way of example, in a practical form of the invention, the lower straightening plate 67 may be held fixed by an apparatus (not shown) so that its upwardly-facing plane plate surface underlies the belt length 81–1 and guides the superposed belt lengths 81–1, 82–1 passing over it along the same plane at which they leave their position shown along the upper surface of the last rightward bending roller 61, as seen in FIG. 5. The opposite overlying straightening plate 68 is held with its flat, downward surface under pressure against the surface of the underlying upper belt length 82–1 which moves above the underlying flat surface of the underlying straightening plate 67. Suitable downward pressure forces 68–1 are applied to the upper straightening plate 68, for instance, by applying pressure forces 68–1 to laterally spaced portions of the upper staightening plate 68, as by conventional, suitably compressed coiled springs (not shown). In the form of apparatus shown, the upper guide belt 82 is of shorter length than the lower guide belt 81, and the axis of its stretching roller 69 is laterally displaced to the left of the axis of the stretching roller 69 of the bottom belt 81 (as seen in FIG. 5). Similarly, the length of the upper straightening plate 68 in the direction of the motion of the electrode plate strip 60–3 is somewhat shorter than the corresponding length of the underlying straightening plate 67.

The transverse width of the guide belts 81, 82 is somewhat greater than the transverse width of the longitudinal electrode plate strip 60, the sintered layer of which is to have produced therein an array of adjacent line-cracks 42–1 (FIG. 4) as it moves through the apparatus of FIG. 5 from the left to the right thereof. The axial length of the bending rollers 61, and 62, 63 and the stretching rollers 69, is at least as great as the transverse width of the guide belts 81, 82 which are guided and driven by the rollers. By way of example, if the electrode plate strip 60 has a transverse width of three inches, the two guide belts 81, 82 may have a width of about ½", and their associated rollers 61, 62, 63, 69, may have an axial length about equal or slightly longer than the transverse width of the two belts 81, 82.

In practice, good results are obtained with conventional, slightly stretchable, rubber-fabric belts for the two guide belts 81, 82, with each belt consisting, for instance, of superposed layers of fabric which are impregnated with and embedded between layers of flexible elastic, rubber-like material. With such slightly stretchable rubber belts, the bearings 69–2 of the two tensioning rollers 69 may be set or held fixed in a position where each of the two guide belts 81, 82 is held stretched, and the bearings 65 of the shafts of the two movable upper set of bending rollers 62, 63 are set under the required pressure in an overlapped position such as shown in FIG. 1, in relation to the opposite set of bending rollers 61, to assure that each longitudinal portion of the electrode plate 60 moving with the overlying belt lengths 81–1, 82–1 between the opposite sets of bending rollers 61, and 62, 63, is subjected to a succession of at least two opposite bending and cracking actions. In a similar way, the pressure-setting means whereby pressure 68–1 is applied to the two straightening plates 67, 68, is set so as to assure straightening and restoring of the planar shape of the transversely cracked successive longitudinal portions of the electrode plate strip 60–2 passing between them without exerting excessive braking forces on the surfaces of the two underlying belt lengths passing between them. Good results are obtained by polishing the flat, exterior surfaces of the two straightening members 67, 68 through which straightening pressure is applied to the belt length of the two belts 81, 82 passing between them.

Instead of using opposite straightening plates 67, 68 having rigid, flat belt-facing wall surfaces that are held pressed against the interior belt surfaces of the two belt lengths 81–1, 82–1, the straightening plates may be modified by providing their belt-facing surfaces with an array of adjacent revolvably-mounted pressure rollers of relatively small diameter extending parallel to the bending rollers 61, 62, 63, and exerting on the underlying belt lengths 81–1, 82–1, strip-straightening forces similar to those exerted by the rigid, belt-facing surfaces of the straightening plates 67, 68 described above. FIG. 6 shows by way of example, a longitudinal portion of the upwardly-facing surface of a so-modified straightening plate 67–1 which is used in lieu of the straightening plate 67 of FIG. 1, the upper straightening plate 68 being modified in a similar manner.

FIG. 6 shows the dimensions of the several elements of straightening plate 67–1 exaggerated for the sake of clarity, and with a part thereof broken away. As so-modified, the bottom straightening plate 67–1 is provided along its belt-facing surface underlying the guide-belt length 81–1, with an array of adjacent, parallel, revolvably-mounted rollers 67–2. Each roller 67–2 has an axis of revolution which is parallel to the revolution-axis of the bending rollers 61, and 62, 63, and they have a length sufficient to extend slightly beyond the transverse width of the belt lengths 81–, 82–1 passing thereover. Each revolvable pressure roller 67–2 may be of very narrow width, for instance, about ⅛" or ³⁄₃₂" in diameter, or even less, and they are revolvably mounted adjacent each other, so that their revolving side surfaces are spaced from each other by a very minute gap spacing which is just sufficient to suppress frictional engagement between them.

The opposite ends of each narrow pressure roller 67–2 are journalled in bearing openings formed, for instance, in two bearing strips or members 67–3 held suitably affixed to the straightening plate 67–1 along the opposite side border regions 67–4 thereof. The revolvable shaft ends of each pressure roller 67–2 may be of slightly smaller diameter than the pressure roller itself, and they are revolvably held in suitably smaller bearing openings 67–5 of the longitudinal bearing members 67–3. Since each guide belt 81, 82 is formed of a relatively firm substance, the array of adjacently positioned, revolvably-mounted, narrow pressure rollers 67–2 provided on each such pressure plate 67, 68, will exert the required straightening forces on the previously-bent and cracked electrode plate strip length 60–2 passing between them, and will align it in a plane with great effectiveness similar to that of the rigid straightening plates 67, 68 described above in connection with FIG. 5. The provision of the revolvably mounted pressure rollers 67–2 on the belt-facing surfaces of the two straightening members 67, 68 is effective in minimizing friction between the moving belts and the pressure-exerting straightening plates 67, 68 overlying the belt lengths 81–1, 82–1 moving between them.

Without thereby limiting the scope of the invention, but only to enable more ready practice thereof, there will now be given further data of the principal elements of one form of the apparatus of the invention described above in connection with FIG. 5:

Each bending roller 61 is of steel, and 1.125" in diameter. Upper bending roller 62 is of steel, and ¹⁵⁄₁₆" in diameter. Upper bending roller 63 is 1.125" in diameter, and has an exterior rubber layer. The axial spacing between each pair of bottom bending rollers 61 is 1¼". The driven lower bending roller 61 (leftmost in FIG. 5) has an exterior surface which is knurled in a direction parallel to its axis to give it firm gripping engagement with the belt 81 guided and driven thereby. Each belt 81, 82 is ⅛" thick. Each of the two tensioning rollers 69 is 1¼" in diameter. The upper and lower straightening plates 67 and 68 is each ⅜" thick and 4⅜" wide. The length of the lower straightening plate 67 (in a direction parallel to the motion direction of electrode plate strip 60) is 9¾", and that of the upper straightening plate 68 is 8¼".

In accordance with the invention, the flat array of adjacent, parallel pressure rollers 67–2 carried along the flat belt-facing surfaces by the flat straightening plates 67, 68, may have the two opposite ends of each pressure roller 67–2 revolvably supported in longitudinal bearing members 67–3 of a cage-like structure, in the same way as an array of adjacent parallel rollers of a roller bearing is supported in a roller cage, so as to permit such flat array of adjacent pressure rollers 67–2 to be moved under pressure with an oscillatory movement in the direction of the belt movement over the underlying moving belt length. The two pressure plates 67, 68 may have imparted thereto the desired small oscillatory movement which they transmit through their respective roller cages 67–3 for causing their respective array of pressure rollers 67–2 to perform such oscillatory movement over the interior surface of their underlying respective belt lengths 81–1, 82–1, while exerting thereon the straightening pressure forces required for aligning all previously cracked portions of the plate strip 60 into a planar shape, as described above.

The process and apparatus for producing a coilable sintered electrode plate for alkaline batteries, with an array of parallel, adjacent, substantially linear cracks extending transversely to side edges of the plate, has been described above in connection with an electrode plate wherein the sintered layer extends along one side only of a coextensive metallic grid of relatively high tensile strength united thereto. However, the so-described process and apparatus may be used in substantially the same way for producing an array of similar adjacent cracks in a similar electrode plate wherein a metallic grid of high density and strength is embedded between two porous layers of sintered metal particles united by sintering, to such grid.

The subject matter of the invention disclosed herein involving a fusion sealed metallic casing enclosure for an alkaline battery cell having a terminal member which is held insulated from the adjacent casing wall by an insulating collar which is joined by hermetic fusion seals to the adjacent casing opening and to the terminal member held thereon constitutes the subject matter of the copending application of the same applicant, Serial No. 119,762, filed May 10, 1961, as a continuation in part of his prior application Serial No. 843,402, filed Sept. 30, 1959, and now abandoned.

It will accordingly be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described herein.

I claim:

1. In an alkaline storage battery, an electrode assembly comprising at least one spirally coiled electrode plate comprising a thin metallic grid integral with a porous layer of sintered metal particles sintered and united to said grid along coextensive areas, the pores of said sintered layer being loaded with active electrode material, said grid being displaced from the central stratum of said plate and extending adjacent the outward convex surface of said plate and holding circumferentially compressed the thickness of its coiled sintered layer stratum facing the concave surface of said grid, said sintered layer stratum being held in circumferentially compressed condition by the coiled condition of said grid.

2. In an alkaline battery, an electrode assembly comprising at least one spirally coiled electrode plate having a thin metallic grid integral with a porous layer of sintered metal powder particles sintered and united to said grid along coextensive areas, the pores of said sintered layer being loaded with active electrode material, said grid being displaced from the central stratum of said plate and extending adjacent the outward convex surface of said plate and holding circumferentially compressed the thickness of its coiled sintered-layer stratum facing the concave surface of said grid, the sintered layer of said electrode plate being at least about .020 inch thick and having an array of adjacent cracks extending generally parallel to said common axis, said sintered layer stratum being maintained in circumferentially compressed condition by the coiled condition of the grid.

3. In an alkaline battery, an electrode assembly comprising at least two electrode plates of opposite polarity, and a porous electrically-insulating separator layer extending between and separating said plates and holding electrolyte through which electrolytic action is maintained between said plates, each of said electrode plates having a thin metallic grid integral with a porous layer of sintered metal powder particles sintered and united to said grid along coextensive areas, the pores of the sintered layer of each electrode plate being loaded with active electrode material, said opposite-polarity electrode plates together with said separator layer being spirally coiled in superposed relation around a generally common axis, the grid of each coiled plate being displaced from the central stratum of its plate and extending adjacent the outward convex surface of its plate and holding circumferentially compressed the thickness of its coiled sintered layer stratum facing the concave surface of its grid, said sintered-layer stratum of each plate being maintained in circumferentially compressed condition by the coiled condition of the respective grids.

4. In an alkaline battery, an electrode assembly comprising at least two electrode plates of opposite polarity, and a porous electrically-insulating separator layer extending between and separating said plates and holding electrolyte through which electrolytic action is maintained between said plates, each of said electrode plates having a thin metallic grid integral with a porous layer of sintered metal powder particles sintered and united to said grid along coextensive areas, the pores of the sintered layer of each electrode plate being loaded with active electrode material, said opposite-polarity electrode plates together with said separator layer being spirally coiled in superposed relation around a generally common axis, the grid of each coiled plate being displaced from the central stratum of its plate and extending adjacent the outward convex surface of its plate and holding compressed the thickness of its coiled sintered layer stratum facing the concave surface of its grid, the sintered layer of each of said electrode plates being at least .020 inch thick and the sintered layer stratum of each plate being held in circumferentially compressed condition by the coiled condition of the respective grid.

5. A method of making an electrode plate for a rechargeable alkaline battery which comprises the steps of applying a layer of metallic particles predominately along one surface only of said perforated backing member to cause substantially most of the particles so applied to remain on said one surface, sintering said backing member and the applied particles to cause said applied particles and said backing member to be united into an integral plate having pores in said particle layer, loading the pores of said backing layer with active electric material and activating said electric material, and thereafter coiling the so formed plate so that said sintered particle layer containing said most of said particles are on the concave side of said backing member to effect circumferential compression in said layer portion on said concave side, said portion comprising substantially most of the metallic particles originally applied.

6. A method as set forth in claim 5, including the steps of effecting spaced cracks in the sintered layer parallel to the axis around which said plate is to be coiled, said cracks being effected subsequent to sintering and prior to coiling.

References Cited in the file of this patent

UNITED STATES PATENTS

| | | |
|---|---|---|
| 654,557 | Tommasi | July 24, 1900 |
| 2,422,046 | Ruben | June 10, 1947 |
| 2,487,499 | Webb | Nov. 8, 1949 |
| 2,681,375 | Vogt | June 15, 1954 |